(12) United States Patent
Vedhagiri et al.

(10) Patent No.: US 9,897,318 B2
(45) Date of Patent: Feb. 20, 2018

(54) METHOD FOR DIVERTING FLOW AROUND AN OBSTRUCTION IN AN INTERNAL COOLING CIRCUIT

(71) Applicant: General Electric Company, Schenectady, NY (US)

(72) Inventors: Sivaraman Vedhagiri, Greer, SC (US); Brian David Moran, Greenville, SC (US); Shawn Kelley, Greenville, SC (US)

(73) Assignee: General Electric Company, Schenectady, NY (US)

( * ) Notice: Subject to any disclaimer, the term of this patent is extended or adjusted under 35 U.S.C. 154(b) by 715 days.

(21) Appl. No.: 14/527,476

(22) Filed: Oct. 29, 2014

(65) Prior Publication Data
US 2016/0123591 A1 May 5, 2016

(51) Int. Cl.
| | | |
|---|---|---|
| F01D 21/00 | (2006.01) |
| F01D 25/12 | (2006.01) |
| F01D 25/14 | (2006.01) |
| F23R 3/00 | (2006.01) |
| F23R 3/26 | (2006.01) |
| F02C 6/08 | (2006.01) |
| F02C 7/18 | (2006.01) |

(52) U.S. Cl.
CPC ............ F23R 3/002 (2013.01); F01D 21/003 (2013.01); F01D 25/12 (2013.01); F01D 25/14 (2013.01); F02C 6/08 (2013.01); F02C 7/18 (2013.01); F23R 3/26 (2013.01); F05D 2260/20 (2013.01); F05D 2260/30 (2013.01); Y02T 50/676 (2013.01)

(58) Field of Classification Search
CPC ........ F01D 21/00; F01D 21/003; F01D 25/08; F01D 25/12; F01D 25/14; F01D 25/26; F16L 41/08–41/12; F16L 9/18–9/20
USPC ............. 137/89, 110, 561 A, 628.28, 599.01
See application file for complete search history.

(56) References Cited

U.S. PATENT DOCUMENTS

| | | | | |
|---|---|---|---|---|
| 3,899,878 | A | * | 8/1975 | Compton ............... F01D 17/085 250/308 |
| 5,421,652 | A | * | 6/1995 | Kast ...................... F01D 21/003 356/44 |
| 5,605,438 | A | | 2/1997 | Burdgick et al. |
| 5,802,841 | A | | 9/1998 | Maeda |
| 6,082,963 | A | | 7/2000 | Sexton et al. |
| 6,142,734 | A | | 11/2000 | Lee |
| 6,146,091 | A | | 11/2000 | Watanabe et al. |

(Continued)

FOREIGN PATENT DOCUMENTS

EP 2182175 5/2010

*Primary Examiner* — Laert Dounis
(74) *Attorney, Agent, or Firm* — Nixon & Vanderhye P.C.

(57) ABSTRACT

A rotary machine including: a casing providing an annular chamber for rotating components of the machine; a cooling passage extending through the casing or mounted to a surface of casing; a plug assembly connected to the cooling passage and in the casing or mounted to the casing, wherein the plug assembly includes a collar and a conduit aligned with an axis of the collar, and the collar includes a cooling air by-pass passage in fluid communication with the cooling passage such that cooling air from the cooling passage flows through the by-pass passage and returns to the cooling passage, and another cooling passage or a port extending through the conduit of the plug assembly.

20 Claims, 5 Drawing Sheets

(56) References Cited

U.S. PATENT DOCUMENTS

| | | | |
|---|---|---|---|
| 6,352,404 B1 | 3/2002 | Czachor et al. | |
| 6,691,019 B2 | 2/2004 | Seeley et al. | |
| 7,631,502 B2 | 12/2009 | Burd et al. | |
| 7,641,444 B1 | 1/2010 | Liang | |
| 7,854,122 B2 | 12/2010 | Steele | |
| 8,021,109 B2 | 9/2011 | Kneeland et al. | |
| 8,047,763 B2 | 11/2011 | Black | |
| 8,128,353 B2 | 3/2012 | Flanagan et al. | |
| 8,152,446 B2 | 4/2012 | Zhang et al. | |
| 8,210,815 B2 | 7/2012 | Bezencon et al. | |
| 8,215,159 B2 | 7/2012 | Kell et al. | |
| 8,240,980 B1 | 8/2012 | Liang | |
| 8,277,170 B2 | 10/2012 | Hess et al. | |
| 8,328,518 B2 | 12/2012 | Liang et al. | |
| 8,371,800 B2 | 2/2013 | Meenakshisundaram et al. | |
| 8,413,449 B2 | 4/2013 | Haehnle et al. | |
| 8,448,437 B2 | 5/2013 | Barber | |
| 8,523,527 B2 | 9/2013 | Lacy et al. | |
| 8,640,496 B2 | 2/2014 | Howard | |
| 2011/0189000 A1* | 8/2011 | Vedhagiri | F01D 25/08 415/178 |
| 2014/0090399 A1* | 4/2014 | McAlice | F02K 1/82 60/796 |

\* cited by examiner

METHOD FOR DIVERTING FLOW AROUND AN OBSTRUCTION IN AN INTERNAL COOLING CIRCUIT

BACKGROUND OF THE INVENTION

The invention relates to cooling circuits in the casings of rotary machine and particularly to cooling passages in the casing of a gas turbine.

The casing of a rotary machine typically includes cooling passages that deliver cooling air to various locations in the machine such as inner shells of the casing and nozzles or vanes extending into a turbine or compressor. The cooling passages typically extend laterally through the casing. The cooling passages are conventionally arranged to avoid intersecting with another cooling passage. Avoiding intersecting cooling passages can limit the available positions for cooling passages and potentially result in a contorted cooling passage(s).

Ports in the casing allow bore scopes, light probes and other instruments to be inserted into the casing to inspect internal components of the gas turbine. The ports generally extend radially through the casing. The ports are positioned to avoid cooling passages in the casing. Positioning ports to avoid cooling passages and reach a desired internal position in the gas turbine can be difficult. There are many cooling passages in a typical turbine casing. The positions available for a port may be few and not aligned with regions in the turbine which should be inspected.

Because cooling passages may limit the path of other cooling passages and make difficult to position a port at certain locations on the casing, there is a long felt need for methods and apparatuses that allow greater freedom in positioning of cooling passages and ports and that ensure that cooling passages are not blocked due to intersections with other cooling passages and ports.

BRIEF DESCRIPTION OF THE INVENTION

A plug assembly has been conceived that allows cooling passages to intersect or a port to intersect a cooling passage. The plug assembly includes a collar positioned in a cooling passage at a location corresponding to a port. The collar provides a by-pass cooling passage that extends around either or both sides of the port or another cooling passage.

The plug assembly includes a hollow cylindrical insert that is seated within the collar. The insert provides an opening to receive another cooling passage or a port. The insert and its opening may be aligned with an axis of the other cooling passage or an axis of the port.

In the case of a port, the axis of the opening of the insert may intersect the region of the turbine which will be inspected by an instrument inserted into the port. The port may be formed by a tubular shaft extending through the casing and coaxial with the radial line. The tubular shaft extends to the insert of the plug assembly.

The invention may be embodied as a rotary machine including: a casing providing an annular chamber for rotating components of the machine; a cooling passage extending through the casing or mounted to a surface of casing; a plug assembly connected to the cooling passage and in the casing or mounted to the casing, wherein the plug assembly includes a collar and a conduit aligned with an axis of the collar, and the collar includes a cooling air by-pass passage in fluid communication with the cooling passage such that cooling air from the cooling passage flows through the by-pass passage and returns to the cooling passage, and another cooling passage or a port extending through the conduit of the plug assembly.

The conduit may include a hollow plug comprising an outer plug and an inner plug, wherein the outer plug fits into an opening in the inner plug, and the outer plug includes a flange seated on an outer surface of the inner shell and the inner plug includes a flange seated on an inner surface of the casing. The outer plug may include a ring slot in an outer sidewall, and the inner plug includes a lip on an inner wall, wherein the lip engages the ring slot while the outer plug and inner plug are joined together. The outer plug may also include an interior ledge configured to receive an end of a hollow tube aligned along a radial line of a rotating axis of the rotary machine.

The collar may be a hollow annular chamber formed within the casing. The collar may alternatively be an annular housing mounted to an outer surface of an inner shell of the casing and aligned with an opening extending through the inner shell, and the annular housing includes a mount for an end of a hollow tube of an instrumentation port, wherein the conduit is formed by an inner annular wall of the annular housing. The annular housing may include an outer sidewall and openings through the outer sidewall that are connected to the cooling passage.

The invention may be embodied as a port for an instrument to inspect a rotary machine, the port comprising: a hollow tube extending at least partially through a casing of the machine, wherein the hollow tube is transversely aligned with a rotational axis of the machine, wherein the hollow tube includes a proximal end at an outer surface of the casing and a distal edge proximate to an inner surface of the casing, and a plug assembly in or mounted to the casing and connected to the distal end of the hollow tube, the plug assembly includes a collar and a conduit, wherein the conduit is coaxial with and open to a passage of the hollow tube and the collar defines a cooling air by-pass passage open to a cooling air passage in or mounted to the casing.

A method to provide a by-pass passage for a cooling passage in a casing of a rotary machine comprising: mounting a plug assembly in the casing or to a outer surface of the casing, wherein the plug assembly includes a collar with a by-pass cooling passage and a center opening; extending a first cooling passage or tube through the center opening of the collar, and connecting the by-pass cooling passage to a second cooling passage such that cooling air flows through the second cooling passage, through the by-pass cooling passage and returns to the second cooling passage.

DETAILED DESCRIPTION OF THE INVENTION

Figure 1:
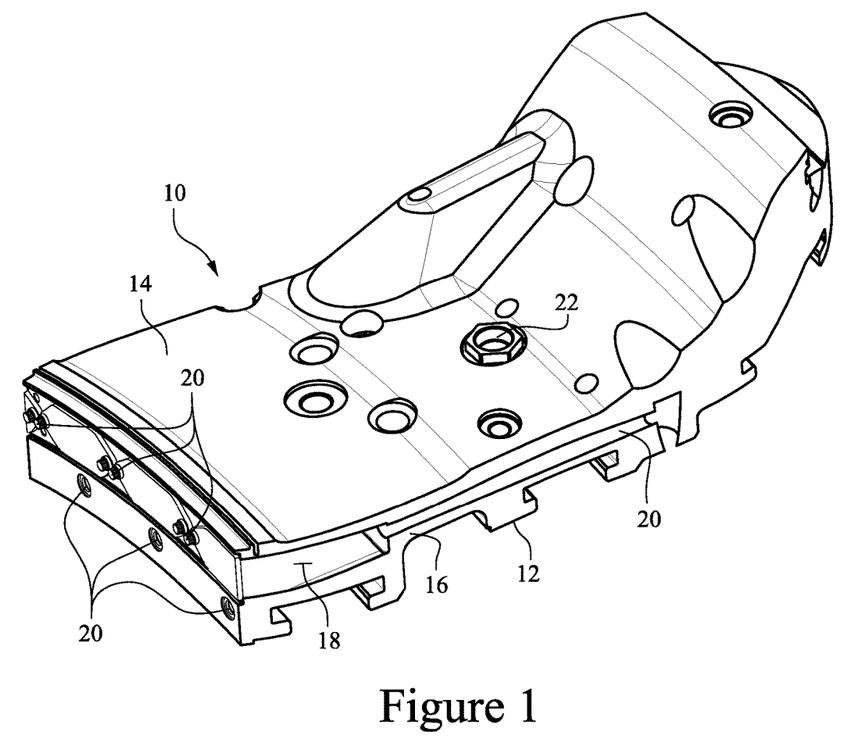
FIG. 1 is a perspective view of a portion of an annular casing for a turbine section of a gas turbine.

FIG. 1 shows a portion of an annular casing 10 for the turbine of a gas turbine or other rotary machine. The casing 10 encloses the rotating components of the machine, such as rows of turbine buckets (blades) and wheels and the shaft of the gas turbine. The casing 10, which is typically metallic, forms a hollow chamber for the rotating components. The casing has internal surfaces 12 that support rows of alternate with stationary shrouds and nozzles (vanes) that surround and the rows of buckets. The shrouds and nozzles are arranged with the nozzles to define a gas path through the turbine.

The casing 10 may include an outer shell 14 and an inner shell 16. The shells may be formed together or assembled as separate components. The outer shell encloses and surrounds the inner shell. The inner and outer shells form a double-walled for the casing 10. The inner and outer walls may be connected by ribs, flanges and other support structures extending between the walls.

Cooling passages 20 may be embedded in the inner shell or extend into the gap 18 between the inner and outer shells. The cooling passages 20 provide cooling air to cool the turbine. The source of the cooling air may be compressed air extracted from the compressor of the gas turbine. The cooling passages 20 typically extend laterally through the casing to various sections of the turbine. The cooling passages provide cooling to the internal casing and cooling air to turbine components, such as annular arrays of nozzles (vanes) and annular seals for rotating turbine buckets (blades). The cooling passages are typically arranged symmetrically around the circumference of the casing.

Ports 22 extend through the casing to provide passages for the insertion of a shaft 24 of an instrument, such as a bore scope or light probe. The ports typically are narrow passages extending along a radial line with respect to the turbine rotational axis. While the gas turbine is shut down, the instrument is inserted into the port and the tip of the instrument extends near or into the gas path through the turbine. Optics in the tip enable a technician to visually inspect the turbine near the tip of the instrument and thus inspect, for example, turbine buckets, nozzles, shrouds and other components in the gas path. The ports 22 may be closed during operation of the gas turbine to prevent gas leakage through the ports.

Figure 2:
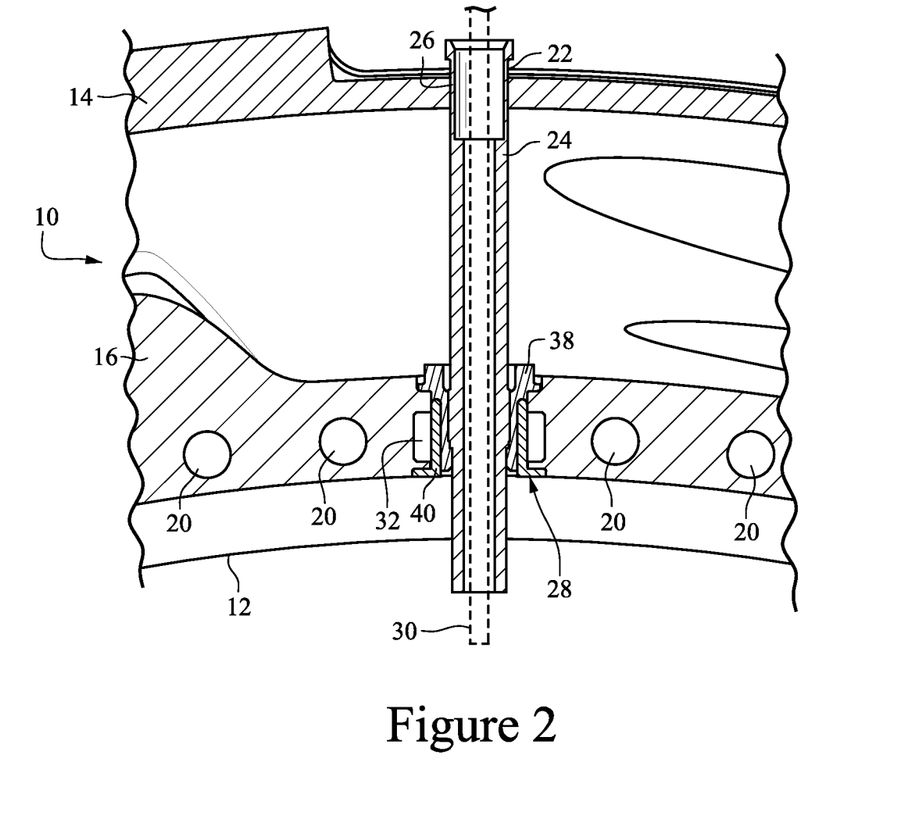
FIG. 2 is a cross-sectional view of a portion of the annular casing, and illustrates cooling passages and an instrumentation port extending through the casing.

FIG. 2 is an enlarged view of a cross section of an inner shell 16 with a cooling passage 20. A radially extending port 22 extends through the casing. The port may be a hollow tube 24 that is supported by the sides of an opening 26 in the outer shell 14 and by a plug assembly 28 in the inner shell 16. A shaft 30 of an instrument, such as a bore scope, is inserting into the tube 24 to inspect a region of the turbine radially inward of the internal surface 12 of the inner shell. The instrument is illustrated by dotted lines in FIG. 2 as it is removable and is typically inserted into the port only during an inspection of the gas turbine.

Figure 3:
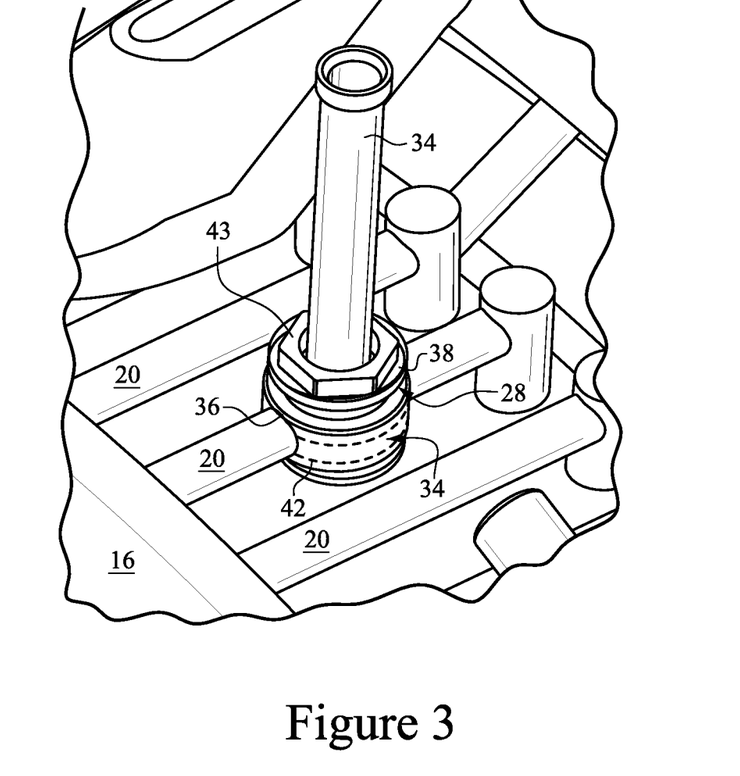
FIG. 3 is a perspective view of a portion of the inner shell of the casing, an instrumentation port intersecting a cooling passage, and a plug assembly at the intersection.

Cooling passages 20 extend laterally through the inner shell as is illustrated in FIG. 2. Cooling passages are also in the gap 18 between the inner and outer shells as illustrated in FIG. 3. The hollow tubes 24 intersect a cooling passage 20 in each of FIGS. 2 and 3. At the intersection is a plug assembly 28 that provides a by-pass passage for the tube 24 and a cooling air passage around the tube.

Without the plug assembly, the intersection could result in the tube 24 blocking the cooling passage 20 and preventing the flow of cooling air through that passage. The prevention of cooling air might have caused the portions of the turbine that would have received the blocked cooling air to become excessively hot and expand more than intended. Excessively hot and excessive expansion of turbine parts can result in thermal damage, rubbing between stationary and rotating turbine components and leakage of hot gases flowing through the gas path in the turbine. By providing a cooling air passage around the tube 24, the plug assembly 28 enables cooling air to properly flow through a cooling passage that would otherwise be blocked by a port. Similarly, the plug assembly allows a port to be positioned at a location on a casing that would otherwise be unavailable due to the presence of the cooling passage.

The cooling passage in the plug assembly 28 may be provided by a collar 32, 34 positioned in the inner shell at the intersection of the cooling passage and the tube 24. The collar may be embedded in the inner shell, as shown in FIG. 2, or mounted to an outer surface of the inner shell. The cooling passage is joined to the collar at opposite sides of the collar. The joint may be formed by machining the collar 32 in the inner shell to intersect the cooling passage. The joint 36 may also be formed by welding, casting or otherwise attaching the collar 34 to the cooling passage such that cooling air does not leak from the passage or collar.

The collar may be an annular opening 32 formed in the inner shell as shown in FIG. 2 or an annular component 34 mounted to the inner shell as shown in FIG. 3. In the example shown in FIG. 2, the collar may be machined or otherwise formed in the inner shell by forming an opening in the inner shell for the plug assembly 28 and expanding the opening to form an annular space coaxial within the shell that is coaxial to the opening. The annular space constitutes the collar 34 embedded in the inner shell 16. As shown in FIG. 3, the collar 34 is embodied as an annular metallic disc mounted to an outer surface of the inner shell 16 and joined 36 to opposing ends of a cooling passage 20. The collar 34 includes an inner cylindrical surface to receive the plugs 38, 40 of the plug assembly and an internal cooling air passage 42. The passage 42 may be an annular passage within the collar 34 and extending between ends of the cooling passage 20 joined to the collar.

FIG. 3 shows a plug assembly 28 mounted to an outer surface of an inner shell 16. The plug assembly 28 intersects a cooling passage 20. The plug assembly 28 includes a collar 34 which includes an annular housing with a hollow internal cooling air passage 42. The collar is mounted in radial alignment with an opening in the inner shell. One end of the collar is sealed to the inner shell to prevent leakage of hot gases from the turbine through the opening covered by the collar. The opposite end of the collar is sealed to an end of the hollow tube 24 for the instrument port. A flanged end of the tube 24 is secured to the collar by a threaded rim extending radially outward from the collar and a nut 43 that biases the flanged end against the collar. The collar 34 in the embodiment of the plug assembly 28 shown in FIG. 3 forms the housing for the internal by-pass cooling passage 42 and the plug for sealing opening in the inner casing to prevent leakage of the hot gases from the turbine.

The cooling passage 42 and the cooling passage formed by collar 32 are in series with the cooling passage 20. The cross-sectional flow area of the cooling passage 42 and the cooling passage formed by the collar may be substantially the same, e.g., within ten percent, of the cross-sectional flow area of the cooling passage 20 adjacent the plug assembly. The gas passage 42 and collar 32 may form an annular gas passage extending around both sides of the plug assembly or forms an arch-shaped passage around one side of the plug assembly. The gas passage 42 and collar 32 may be shaped in cross section as a half-circle, rectangle or other shape.

The internal gas passage 42 in the collar is a sealed gas passage that serves as a gas conduit for gasses flowing through the cooling passage 20 and by-passing the plug assembly. The internal gas passage 42 is sealed to prevent leakage of the cooling air. The internal gas passage may be entirely internal of the collar with only an inlet and an outlet coupled to the cooling passage 20.

Figure 4:
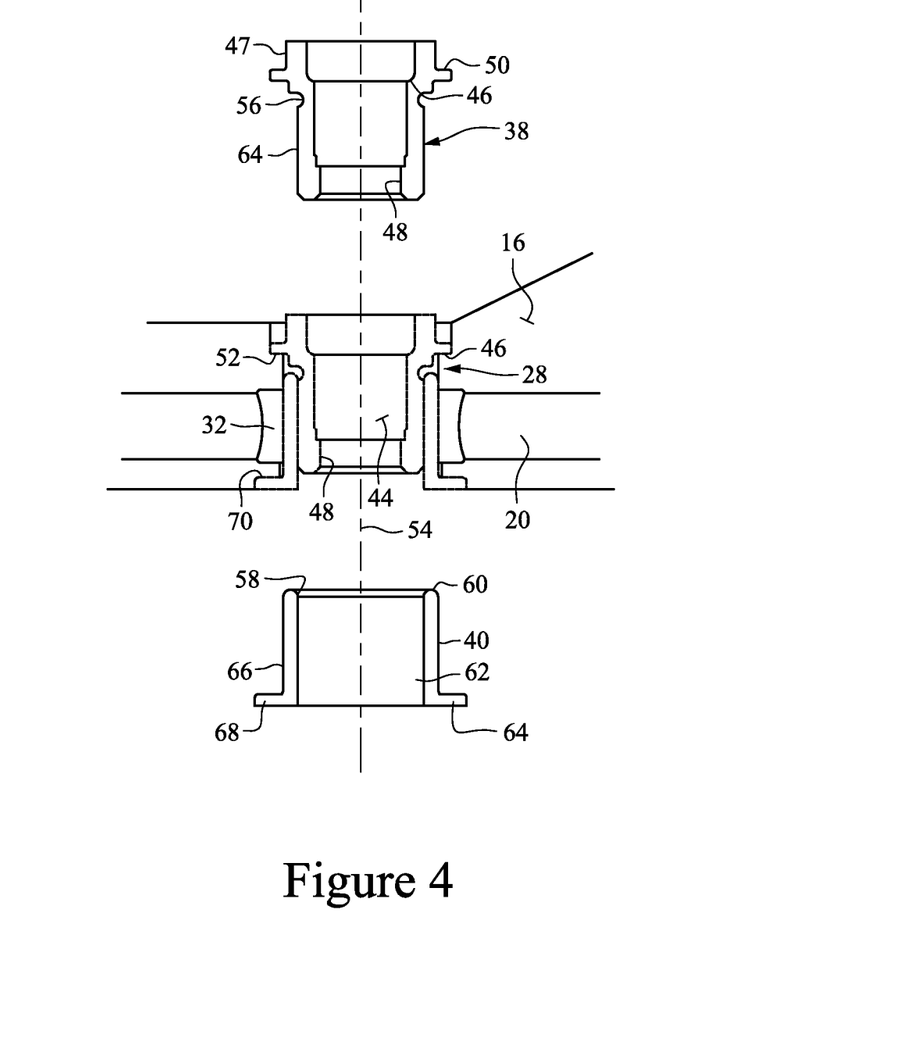
FIG. 4 is a cross-sectional view and an exploded view of a plug assembly positioned in an inner shell of the casing.

FIG. 4 shows the plug assembly 28 configured to seat in an opening of the inner shell. The outer and inner plugs will be described in the context of the plug assembly for the inner shell. A similar outer and low plug may be included in the plug assembly for a cooling passage in the gap between the inner and outer shells, as shown in FIG. 3.

The plug assembly 28 includes an outer plug 38 and an inner plug 40 that fit together to form a support for the hollow tube 24. FIG. 4 shows the outer plug 38 and the inner plug 40 nested together (see dotted lines) and shows the outer plug separated from the inner plug. The outer plug 38 may include an internal passage 44 for the hollow tube 24. The passage 44 may include an annular ledge edge 46 that may serve as a ledge supporting an end of the hollow tube. The hollowing passage 44 may include a bushing surface 48 to provide a sliding surface for the shaft of an instrument such as a borescope.

The outer plug 38 may include an outer annular flange 50 that seats in an annular recess 52 in the inner shell 16. The annular recess 52 is coaxial with the axis 54 of the hollow passage 44. The outer plug 38 may also include a ring slot 56 that is proximate, e.g., immediately below, the outer flange 50. The ring slot receives an annular lip 58 on the inside rim of the outer edge 60 of the inner plug 40. The annular lip may engage the ring slot to mechanical secure the outer plug to the inner plug.

The inner plug 40 includes an inner cylindrical wall 62 that is adjacent an outer cylindrical wall 64 of the outer plug. The outer cylindrical wall 66 of the inner plug 40 may be a smooth cylindrical surface configured to provide an inner wall to an annular chamber that forms the collar 32. An annular flange 68 on an end of the inner plug opposite to the outer end seats in an annular recess 70 on an interior surface of the inner shell 16.

To assembly the plug assembly, the inner plug may be inserted into the opening in the inner shell from the inner side of the shell and the outer plug is inserted from the outer side of the inner shell. As the inner and outer plugs slide together, the lip 58 on the inner plug engages the ring slot on the outer plug to hold the plugs together. The flange 50 on the outer plug seats on the recess 52 in the outer surface of the inner shell and the flange 68 seats on the recess 70 in the inner surface of the inner shell. The seating of the flanges holds the plug assembly in the inner shell and creates seals preventing cooling air leakage from the cooling passage 20.

The outer sidewall 47 may be threaded of an upper rim of the outer plug 38. The threads on the outer sidewall engage a nut or other fastener that secures the end of a hollow tube to the outer plug. The hollow tube forms a port through the casing for the shaft of an instrument, such as a bore scope.

The plug assembly 28 when seated in the inner shell provides a hollow passage 44 that forms a passage 44 for a bore scope or other instrument and an annular edge 46 to seat a distal end of a hollow tube 24 that forms a passage for the instrument. The plug assembly provides a by-pass flow passage for cooling air flowing through a cooling passage 20. The by-pass flow passage is formed by a collar 32 that extends around the assembly of inner and outer plugs 38, 40. Providing a collar for the plug assembly allows the plug assembly to intersect a cooling passage without blocking the passage and thus allows a bore scope to be inserted to view an internal region of the turbine radially aligned with the cooling passage.

Figure 5:
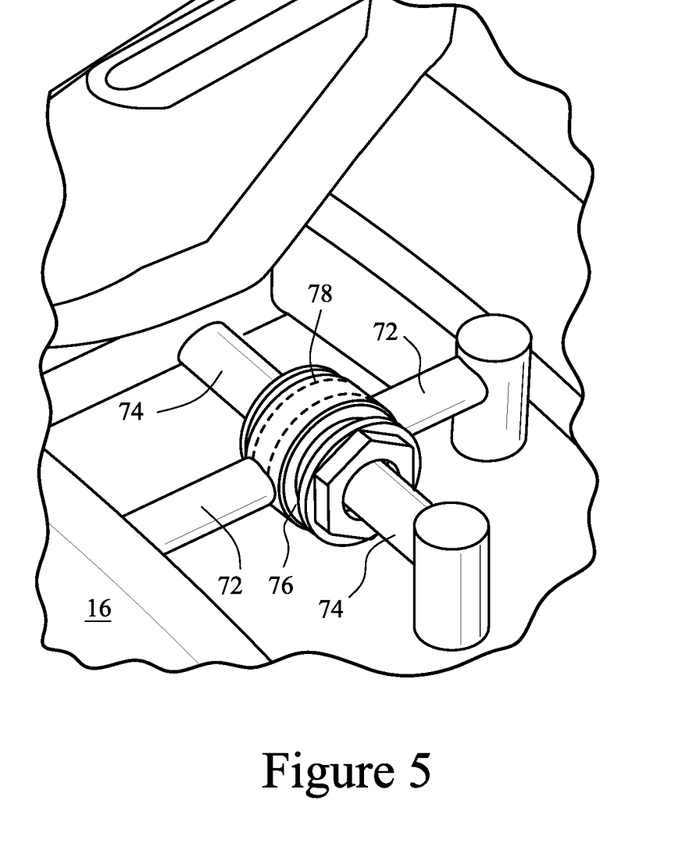
FIG. 5 is a perspective view of a portion of an inner shell of the casing at which cooling passages intersect and a plug assembly at the intersection.

FIG. 5 shows a cooling passage 72 that intersects with another cooling passage 74. A plug assembly 76 is at the point of intersection between the cooling passages. The cooling passages 72, 74 and plug assembly 76 are mounted to the outer surface of the inner shell 16. The cooling passage 74 extends through a conduit at the center of the collar of the plug assembly. The collar of the plug assembly is fitted into the cooling passage 72 such that the cooling air flows from the passage 72 flows through an internal passage 78 in the collar of the plug assembly and back to the passage 72.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary machine comprising:
   a casing providing an annular chamber for rotating components of the machine;
   a cooling passage extending laterally through the casing or mounted to a surface of the casing;
   a plug assembly connected to the cooling passage and in the casing or mounted to the casing, wherein the plug assembly includes a collar and a conduit extending through the collar, and
   a cooling air by-pass passage which is enclosed within the collar and in fluid communication with the cooling passage such that cooling air from the cooling passage flows through the by-pass passage and returns to the cooling passage, and
   another cooling passage or a port extending through the conduit of the plug assembly.

2. The rotary machine of claim 1 wherein the conduit includes a hollow plug comprising an outer plug and an inner plug, wherein the outer plug fits into an opening in the inner plug, and the outer plug includes a flange seated on an outer surface of the inner shell and the inner plug includes a flange seated on an inner surface of the casing.

3. The rotary machine of claim 2 wherein the outer plug includes a ring slot in an outer sidewall, and the inner plug includes a lip on an inner wall, wherein the lip engages the ring slot while the outer plug and inner plug are joined together.

4. The rotary machine of claim 2 wherein the outer plug includes an interior ledge configured to receive an end of a hollow tube aligned along a radial line of a rotating axis of the rotary machine.

5. The rotary machine of claim 1 wherein the collar includes a hollow annular chamber formed within the casing.

6. The rotary machine of claim 1 wherein the collar includes an annular housing mounted to an outer surface of an inner shell of the casing and is aligned with an opening extending through the inner shell, and the annular housing includes a mount for an end of a hollow tube of an instrumentation port, wherein the conduit is formed by an inner annular wall of the annular housing.

7. The rotary machine of claim 6 wherein the annular housing includes an outer sidewall and openings through the outer sidewall that are connected to the cooling passage.

8. The rotary machine of claim 1 wherein the cooling air by-pass passage extends around opposite sides of the conduit.

9. A port for an instrument to inspect a rotary machine, the port comprising:
- a hollow tube extending at least partially through a casing of the machine, wherein the hollow tube is transverse to a rotational axis of the machine, wherein the hollow tube includes a proximal end at an outer surface of the casing and a distal edge proximate to an inner surface of the casing, and
- a plug assembly in or mounted to the casing such that the plug assembly extends entirely through and obstructs a cooling air passage in or mounted to the casing, the plug assembly includes a collar and a conduit, wherein the conduit is coaxial with and open to the hollow tube and the collar includes a cooling air by-pass passage that is enclosed within the collar and open to the cooling air passage such that cooling air from the cooling air passage flows through the cooling air by-pass passage and returns to the cooling air passage.

10. The port of claim 9 wherein the port is aligned to a radial line extending from the rotational axis.

11. The port of claim 9 wherein the conduit includes a hollow plug comprising an outer plug and an inner plug, wherein the outer plug fits into an opening in the inner plug, and the outer plug includes a flange seated on an outer surface of the casing and the inner plug includes a flange seated on an inner surface of the casing.

12. The port of claim 9 wherein the collar is a hollow annular chamber formed within the casing and intersecting the cooling passage within the casing.

13. The port of claim 9 wherein the collar includes an annular housing mounted to an outer surface of an inner shell of the casing and is aligned with an opening extending through the inner shell, and the annular housing includes a mount for an end of the hollow tube, wherein the conduit is formed by an inner annular wall of the annular housing.

14. The port of claim 9 wherein the cooling air by-pass passage extends around opposite sides of the conduit.

15. A method to provide a by-pass passage for a cooling passage in a casing of a rotary machine comprising:
- mounting a plug assembly in the casing or to a surface of the casing, wherein the plug assembly includes a collar with a by-pass cooling passage and a center opening, wherein the by-pass cooling passage is enclosed within the collar;
- extending a first cooling passage or other passage through the center opening of the collar, and
- connecting the by-pass cooling passage to a second cooling passage such that cooling air flows from the second cooling passage, through the by-pass cooling passage and returns to the second cooling passage.

16. The method of claim 15 wherein the opening is aligned with a radial line extending from a rotational axis of the rotary machine.

17. The method of claim 15 wherein the opening is formed by a hollow plug comprising an outer plug and an inner plug, and the method further comprising sliding the outer plug into the inner plug and seating a flange of the outer plug on an outer surface of an inner shell of the casing and seating a flange of the inner plug on an inner surface of the inner shell.

18. The method of claim 15 wherein the method further comprises
- machining in an inner shell of the casing a hollow annular chamber to form the collar.

19. The method of claim 15 wherein the collar includes an annular housing mounted to the surface of the casing and is aligned with an opening extending through the casing, and the annular housing includes a mount for an end of the hollow tube.

20. The method of claim 15 wherein the cooling air by-pass passage extends around opposite sides of the conduit.

* * * * *